United States Patent
Takahashi et al.

(10) Patent No.: US 11,654,972 B2
(45) Date of Patent: May 23, 2023

(54) VEHICLE

(71) Applicants: Toyota Jidosha Kabushiki Kaisha, Toyota (JP); Subaru Corporation, Tokyo (JP)

(72) Inventors: Naoki Takahashi, Miyoshi (JP); Satoshi Ikeda, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 49 days.

(21) Appl. No.: 17/404,354

(22) Filed: Aug. 17, 2021

(65) Prior Publication Data
US 2022/0063730 A1    Mar. 3, 2022

(30) Foreign Application Priority Data
Sep. 3, 2020 (JP) .............................. JP2020-148530

(51) Int. Cl.
| | |
|---|---|
| *B60J 7/00* | (2006.01) |
| *B62D 25/14* | (2006.01) |
| *B62D 25/02* | (2006.01) |
| *B60K 1/04* | (2019.01) |
| *B62D 27/02* | (2006.01) |
| *B62D 21/15* | (2006.01) |

(52) U.S. Cl.
CPC .............. *B62D 25/145* (2013.01); *B60K 1/04* (2013.01); *B62D 25/025* (2013.01); *B62D 27/02* (2013.01); *B60K 2001/0438* (2013.01); *B62D 21/152* (2013.01)

(58) Field of Classification Search
CPC ................ B62D 25/025; B62D 21/152; B62D 25/2018; B62D 25/2036; B62D 25/04; B60R 19/18; B60R 19/34; B60R 19/24; B60R 2019/1813
See application file for complete search history.

(56) References Cited

U.S. PATENT DOCUMENTS

| | | | | |
|---|---|---|---|---|
| 8,573,683 | B2 * | 11/2013 | Gadhiya | B62D 21/152 |
| | | | | 296/203.02 |
| 9,238,487 | B1 * | 1/2016 | Young | B62D 25/2036 |
| 9,272,736 | B1 * | 3/2016 | Clauser | B62D 25/14 |
| 9,701,182 | B1 * | 7/2017 | Hallman | B62D 21/157 |

(Continued)

FOREIGN PATENT DOCUMENTS

| | | |
|---|---|---|
| JP | 2015-101218 A | 6/2015 |
| JP | 2019-130978 A | 8/2019 |

*Primary Examiner* — Kiran B Patel
(74) *Attorney, Agent, or Firm* — Dinsmore & Shohl LLP

(57) ABSTRACT

A vehicle includes a dash cross member, a rocker that is connected to an end portion of the dash cross member, and a reinforcement that reinforces a connected portion of the dash cross member and the rocker. At the connected portion of the dash cross member and the rocker, the dash cross member, the rocker, and the reinforcement are disposed to be overlapped with each other, and a plurality of first weld portions and a plurality of second weld portions are provided. The dash cross member and the rocker are welded to each other at each of the first weld portions. The rocker and the reinforcement are welded to each other at each of the second weld portions. The first weld portions and the second weld portions are arrayed so as not to be overlapped with each other.

6 Claims, 4 Drawing Sheets

(56) References Cited

U.S. PATENT DOCUMENTS

| | | | |
|---|---|---|---|
| 10,207,746 B2* | 2/2019 | Yang | B60N 2/015 |
| 11,440,591 B2* | 9/2022 | Sakurai | B62D 25/08 |
| 2012/0049501 A1* | 3/2012 | Fujii | B60R 22/195 |
| | | | 280/806 |
| 2012/0274100 A1* | 11/2012 | Mildner | B62D 25/2036 |
| | | | 296/193.07 |
| 2015/0001891 A1* | 1/2015 | Saje | B62D 25/2018 |
| | | | 156/92 |
| 2015/0145283 A1 | 5/2015 | Nishino et al. | |
| 2015/0145284 A1* | 5/2015 | Nishida | B62D 25/145 |
| | | | 296/187.1 |
| 2017/0015360 A1* | 1/2017 | Onishi | B62D 21/157 |
| 2017/0029031 A1* | 2/2017 | Yang | B62D 25/20 |
| 2017/0057553 A1* | 3/2017 | Kojima | B62D 25/2036 |
| 2017/0073012 A1* | 3/2017 | Hyuga | B62D 21/152 |
| 2017/0106906 A1* | 4/2017 | Onishi | B62D 25/2036 |
| 2018/0065679 A1* | 3/2018 | Johnson | B62D 25/2036 |
| 2018/0370577 A1* | 12/2018 | Takahashi | B60K 1/04 |
| 2019/0047636 A1* | 2/2019 | Asa | B62D 27/02 |
| 2019/0144046 A1* | 5/2019 | Saeki | B60N 2/015 |
| | | | 296/204 |
| 2019/0232773 A1 | 8/2019 | Kasai et al. | |
| 2020/0001928 A1* | 1/2020 | Ota | B62D 21/152 |
| 2020/0031399 A1* | 1/2020 | Matsuda | B62D 25/2036 |
| 2020/0047810 A1* | 2/2020 | Ayukawa | B21C 23/002 |
| 2020/0180704 A1* | 6/2020 | Murata | B62D 21/152 |
| 2020/0353995 A1* | 11/2020 | Alwan | B62D 25/04 |
| 2020/0369321 A1* | 11/2020 | Alwan | B62D 25/2018 |
| 2021/0179184 A1* | 6/2021 | Ohnaka | B62D 25/04 |
| 2021/0284245 A1* | 9/2021 | Nakamura | B62D 25/2018 |
| 2022/0073141 A1* | 3/2022 | Shimizu | B62D 25/145 |
| 2022/0135142 A1* | 5/2022 | Zwaneveld | B62D 31/02 |
| | | | 296/187.01 |

\* cited by examiner

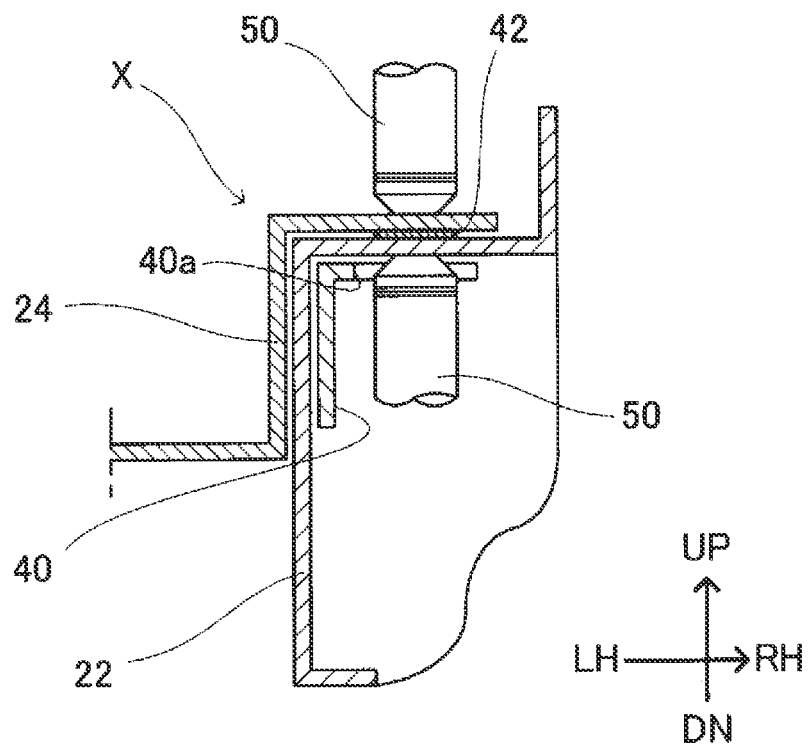

VEHICLE

CROSS-REFERENCE TO RELATED APPLICATION

This application claims priority to Japanese Patent Application No. 2020-148530 filed on Sep. 3, 2020, incorporated herein by reference in its entirety.

BACKGROUND

1. Technical Field

The technology disclosed in the present specification relates to a vehicle.

2. Description of Related Art

Japanese Unexamined Patent Application Publication No. 2019-130978 (JP 2019-130978 A) describes a vehicle. This vehicle is provided with a traction motor that drives wheels, and a battery pack that supplies electric power to the traction motor. The battery pack is disposed below a floor panel.

SUMMARY

In a structure in which a battery pack is disposed below a floor panel, providing structural members on the lower face of the floor panel is difficult. Accordingly, connecting each of both end portions of a dash cross member to a pair of right and left rockers (also referred to as side sills) is conceivable. Now, the dash cross member is a structural member that extends in the right-left direction along the front edge of the floor panel, and the rockers are structural members that extend in the front-rear direction along the side edges of the floor panel. According to this configuration, a collision load entering from the front can be transferred from the dash cross member to the rockers. Thus, collision performance of the vehicle can be significantly improved without providing a structural member on the lower face of the floor panel.

On the other hand, connecting the dash cross member and the rockers to each other readily leads to occurrence of bending deformation of these structural members at the connection portions thereof. Sufficiently reinforcing the connection portions of the dash cross member and the rockers is effective in suppressing such bending deformation. Specifically, an arrangement is conceivable in which reinforcements are added to the connection portions of the dash cross member and the rockers, so that these connection portions have a three-layered structure (i.e., the dash cross member, the rockers, and the reinforcements). However, welding a three-layered structure in which three members are placed to be overlapped with each other with good quality is difficult, and as a result, the strength of the connected portions described above may not be able to be sufficiently increased.

In light of the foregoing, the disclosure provides technology by which the dash cross member and the rockers can be connected with a high level of strength, in a vehicle in which a battery pack is disposed below the floor panel.

A first aspect of the disclosure is a vehicle configured with a battery pack disposed below a floor panel. The vehicle includes a dash cross member extending in a right-left direction along a front edge of the floor panel, a rocker that extends in a front-rear direction along a side edge of the floor panel and that is connected to an end portion of the dash cross member, and a reinforcement that reinforces a connected portion of the dash cross member and the rocker. At the connected portion of the dash cross member and the rocker, the dash cross member, the rocker, and the reinforcement are disposed to be overlapped with each other, and a plurality of first weld portions and a plurality of second weld portions are provided. The dash cross member and the rocker are welded to each other at each of the first weld portions. The rocker and the reinforcement are welded to each other at each of the second weld portions. The first weld portions and the second weld portions are arrayed so as not to be overlapped with each other.

According to the structure of the first aspect above, the reinforcement is added to the connected portion of the dash cross member and the rocker, and this connected portion has a three-layered structure (i.e., the dash cross member, the rocker, and the reinforcement). The three-layered structure is not welded all together, but rather is welded separately at two parts at a time. That is to say, the dash cross member and the rocker are welded at the first weld portions. On the other hand, the rocker and the reinforcement are welded at the second weld portions, of which the positions are different from the first weld portions. According to the above first aspect, the three-layered structure in which the three members are disposed to be overlapped with each other can be integrated by welding with good quality, and the connected portion of the dash cross member and the rocker can be effectively reinforced by the reinforcement.

In the above first aspect, the rocker may be disposed between the dash cross member and the reinforcement at the connected portion of the dash cross member and the rocker.

In the above first aspect, the reinforcement may be located inside the rocker.

In the above first aspect, the reinforcement may have a plurality of notched portions in accordance with the first weld portions.

In the above first aspect, the first weld portions and the second weld portions may be, at least partially, arrayed alternately in the front-rear direction.

In the above first aspect, the reinforcement may extend rearward beyond a distal end of the dash cross member, at the connected portion of the dash cross member and the rocker.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 schematically illustrates the way in which the dash cross member 24 and the right rocker 22 are welded to each other.

DETAILED DESCRIPTION OF EMBODIMENTS

Figure 1:
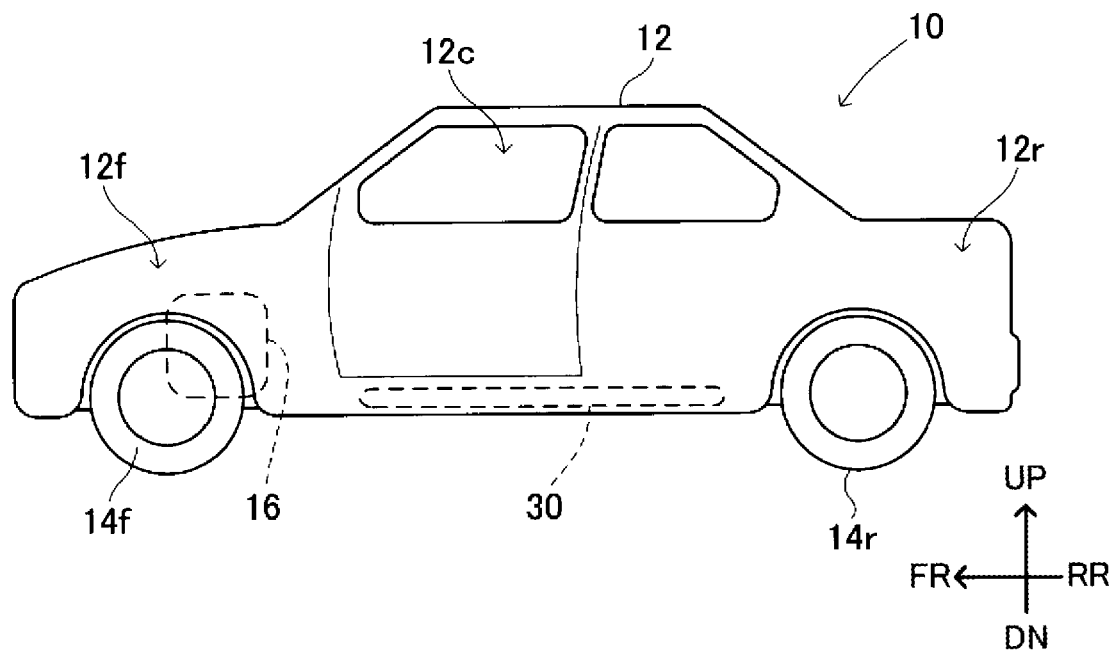
FIG. 1 is a left-side view of a vehicle 10.

In an embodiment of the present technology, a rocker may be disposed between a dash cross member and a reinforcement at a connected portion of the dash cross member and the rocker. That is to say, the reinforcement may be added to the connected portion of the dash cross member and the rocker from the rocker side. In this case, the reinforcement may be located inside the rocker, although this is not limiting in particular. Note however, that the reinforcement may be added to the connected portion of the dash cross member and the rocker from the dash cross member side, as another embodiment.

In an embodiment of the present technology, the reinforcement may have a plurality of notched portions or openings (i.e., through holes) in accordance with a plurality of first weld portions. According to this configuration, connecting the dash cross member and the rocker can be performed by the following procedures. First, the rocker and the reinforcement are combined, and these are welded to each other. A plurality of second weld portions is thus formed. Next, the dash cross member is further combined therewith, and the dash cross member and the rocker are welded to each other at the positions of the notched portions in the reinforcement. Accordingly, the two members of the dash cross member and the rocker can be selectively welded to each other, thereby forming the first weld portions, even in a state in which the three members are disposed to be overlapped with each other.

In an embodiment of the present technology, the first weld portions and the second weld portions may be at least partially arrayed alternately in the front-rear direction. According to such a configuration, the three members of the dash cross member, the rocker, and the reinforcement can be joined more strongly.

In an embodiment of the present technology, the reinforcement may extend further rearward beyond a distal end of the dash cross member, at the connected portion of the dash cross member and the rocker. That is to say, the reinforcement may extend further rearward than a range over which the dash cross member and the rocker face each other. According to such a configuration, the connected portion of the dash cross member and the rocker can be effectively reinforced by the reinforcement.

EMBODIMENT

A vehicle 10 according to an embodiment will be described with reference to the drawings. The vehicle 10 according to the present embodiment is a so-called automobile, and is a vehicle that travels over a road surface. Note that a direction FR in the drawings indicates forward in a front-rear direction of the vehicle 10 (vehicle longitudinal direction), and a direction RR indicates rearward in the front-rear direction of the vehicle 10. Also, a direction LH indicates leftward in a right-left direction of the vehicle 10 (vehicle width direction), and a direction RH indicates rightward in the right-left direction of the vehicle 10. A direction UP indicates upward in an up-down direction of the vehicle 10 (vehicle height direction), and a direction DN indicates downward in the up-down direction of the vehicle 10. Note that the front-rear direction, the right-left direction, and the up-down direction of the vehicle 10 may be referred to simply as front-rear direction, right-left direction, and up-down direction in the present specification.

Figure 2:
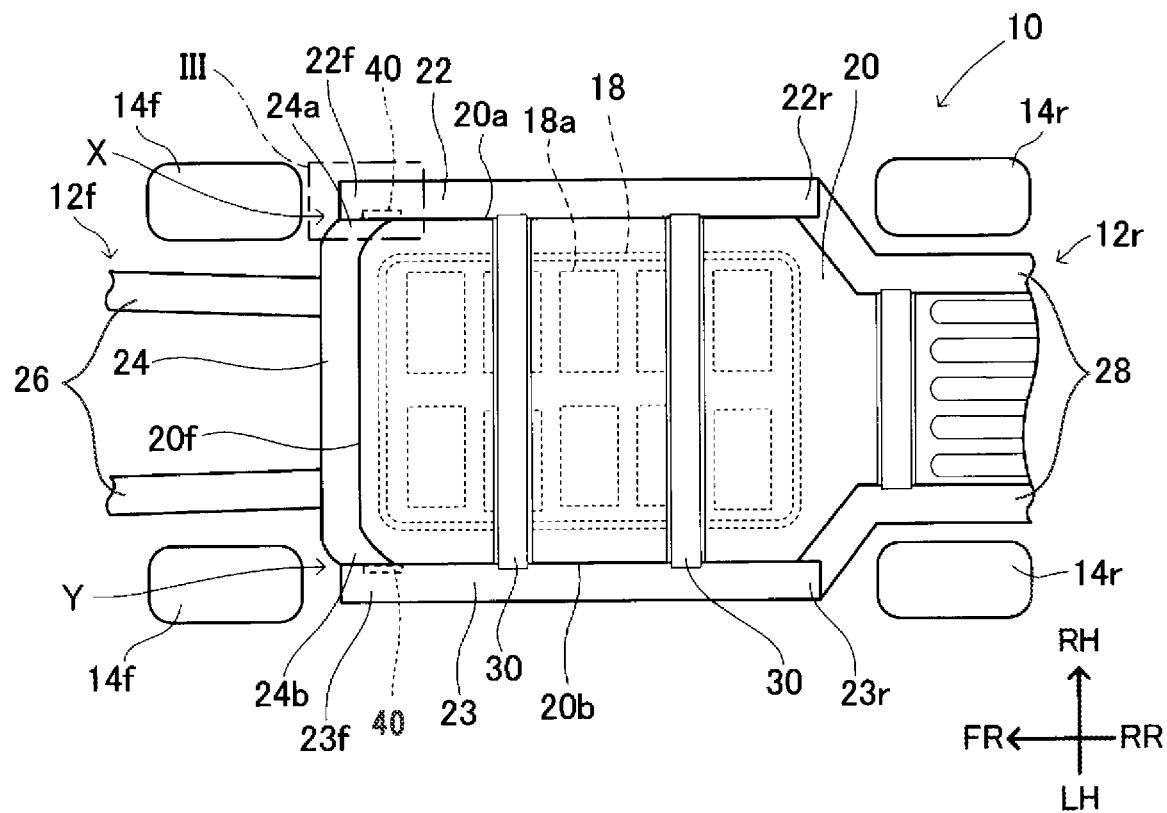
FIG. 2 is a planar view schematically illustrating a structure of a vehicle body 12.

The vehicle 10 is provided with a vehicle body 12 and a plurality of wheels 14*f* and 14*r*, as illustrated in FIGS. 1 and 2. The vehicle body 12 is primarily configured of a metal material, although this is not limited in particular. The wheels 14*f* and 14*r* are rotatably attached to the vehicle body 12. The wheels 14*f* and 14*r* include a pair of front wheels 14*f* and a pair of rear wheels 14*r*. Note that the number of the wheels 14*f* and 14*r* is not limited to four. The vehicle body 12 can be primarily sectioned into a cabin 12*c* where a user rides, a front portion 12*f* located forward of the cabin 12*c*, and a rear portion 12*r* located rearward of the cabin 12*c*.

The vehicle body 12 is provided with a floor panel 20, a pair of rockers that is a right rocker 22 and a left rocker 23, a dash cross member 24, a pair of front side members 26, and a pair of rear side members 28. The floor panel 20 is a plate-like member that extends in the front-rear direction and the right-left direction, and constitutes the floor of the cabin 12*c*. A plurality of floor cross members 30 is provided on the upper face of the floor panel 20. Each floor cross member 30 has a generally tubular structure, and constitutes a part of the framework of the vehicle body 12.

The rockers 22 and 23 (also referred to as side sills) each extend in the front-rear direction along right and left side edges 20*a* and 20*b* of the floor panel 20. Each of the rockers 22 and 23 has a generally tubular structure, and constitutes a part of the framework of the vehicle body 12. The rockers 22 and 23 are connected to the dash cross member 24 at their respective front end portions 22*f* and 23*f*. The rockers 22 and 23 are also connected to the rear side members 28 at their respective rear end portions 22*r* and 23*r*. One or a plurality of bulkheads (partitions) may be provided inside each of the rockers 22 and 23, to improve strength and rigidity of the rockers 22 and 23.

The dash cross member 24 extends in the right-left direction along a front edge 20*f* of the floor panel 20. The dash cross member 24 has a generally tubular structure, and constitutes a part of the framework of the vehicle body 12. A right end portion 24*a* of the dash cross member 24 is connected to the front end portion 22*f* of the right rocker 22, and a left end portion 24*b* of the dash cross member 24 is connected to the front end portion 23*f* of the left rocker 23. A reinforcement 40 is provided at each of a connected portion X of the dash cross member 24 and the right rocker 22 and a connected portion Y of the dash cross member 24 and the left rocker 23. The reinforcements 40 are members for reinforcing the connected portions X and Y, and can reduce bending deformation of the rockers 22 and 23 at the time of a collision of the vehicle 10, for example. The configuration of the reinforcements 40 will be described later in detail.

The front side members 26 are located at the front portion 12*f*, extending forward from the dash cross member 24. The front side members 26 have generally tubular structures extending in the front-rear direction, and constitute a part of the framework of the vehicle body 12. A front bumper reinforcement that is located at the frontmost position of the vehicle body 12 is attached to the front ends of the front side members 26, although this is omitted from illustration. The rear side members 28 are located at the rear portion 12*r*, extending continuously rearward from the rockers 22 and 23. The rear side members 28 have generally tubular structures extending in the front-rear direction, and constitute a part of the framework of the vehicle body 12. A rear bumper reinforcement that is located at the rearmost position of the vehicle body 12 is attached to the rear ends of the rear side members 28, although this is omitted from illustration.

The vehicle 10 is further provided with a traction motor 16 and a battery pack 18. The traction motor 16 is disposed at the front portion 12*f*, although this is not limited in particular. The traction motor 16 is connected to the front wheels 14f and drives the front wheels 14f. Note that the vehicle 10 may be provided with, in addition to or instead of the traction motor 16 that drives the front wheels 14f, a second traction motor that drives the rear wheels 14r. The vehicle 10 may also be provided with another power plant such as an engine or the like, in addition to or instead of the traction motor 16.

The battery pack 18 is disposed below the floor panel 20, and is located between the rockers 22 and 23. The battery pack 18 is a power source for the traction motor 16, and stores electric power to be supplied to the traction motor 16. The battery pack 18 is electrically connected to the traction motor 16 via an electric power supply circuit (omitted from illustration) such as a direct current-direct current (DC-DC) converter, inverter, or the like. The battery pack 18 according to the present embodiment has a plurality of cell stacks 18a, although this is not limited in particular. Each of the cell stacks 18a includes a plurality of lithium-ion battery cells (or some other secondary battery cells), and is configured to be rechargeable. Note that the vehicle 10 may be provided with, in addition to or instead of the battery pack 18, some other power source, such as a fuel cell unit, a solar cell panel, or the like.

Figure 3:
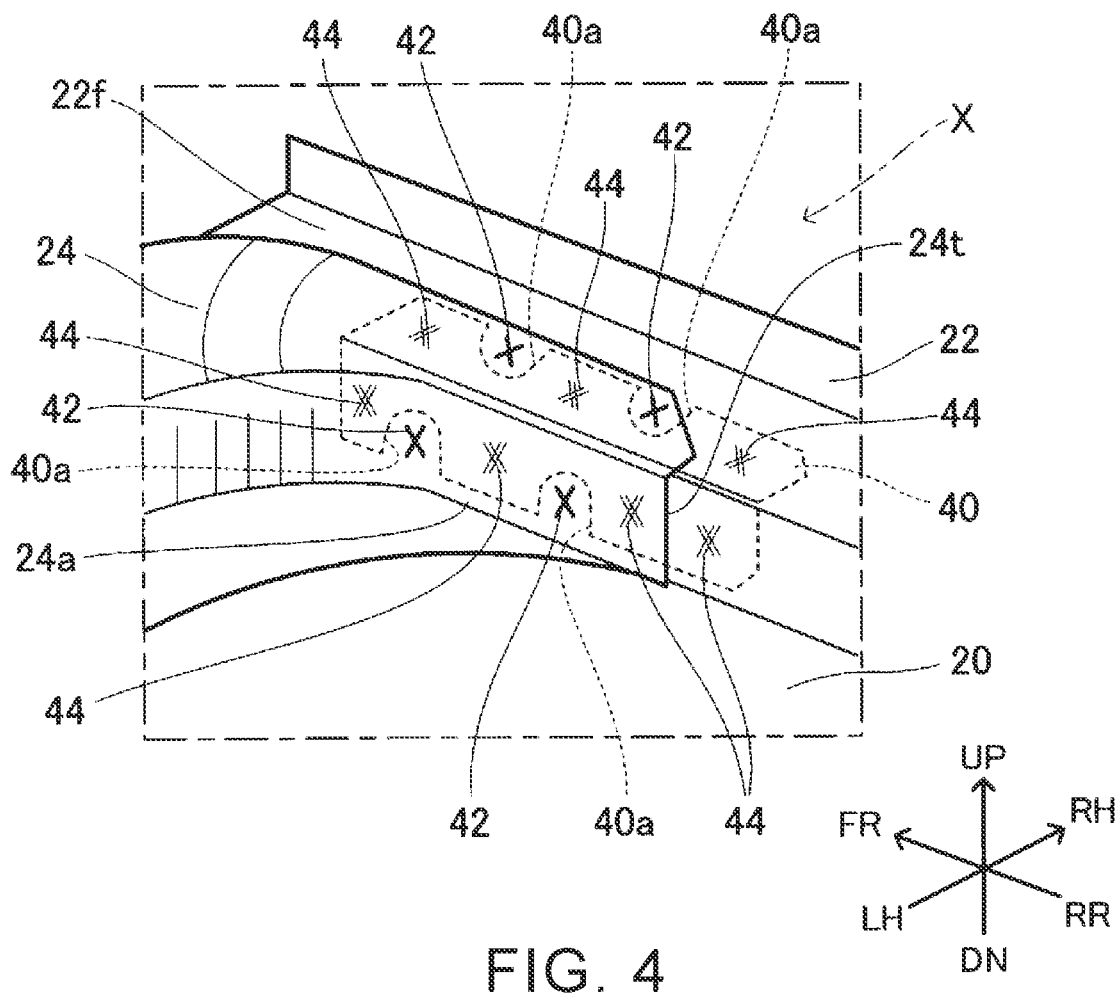
FIG. 3 is a perspective view illustrating a portion along III in FIG. 2 enlarged.
Figure 4:
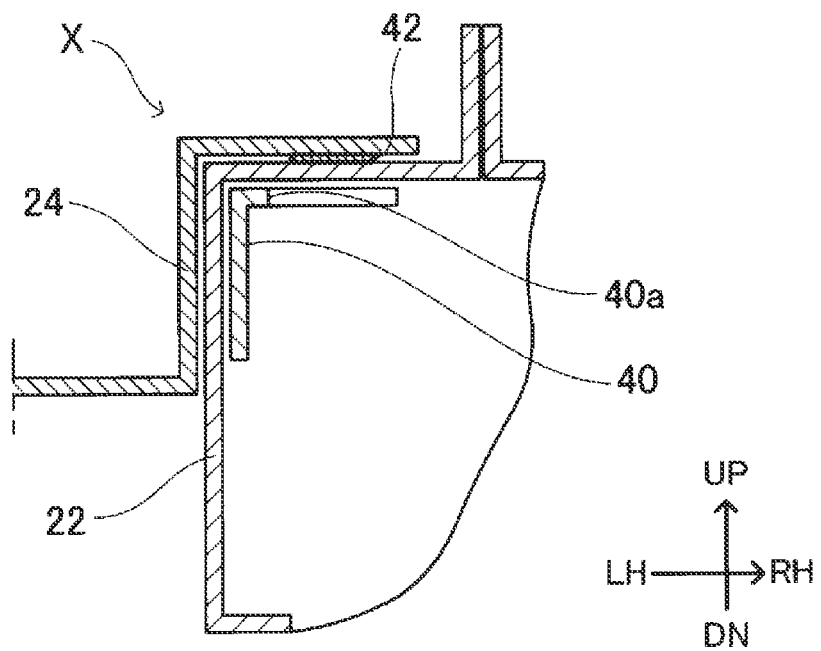
FIG. 4 illustrates a cross-sectional structure of a connected portion X of a dash cross member 24 and a right rocker 22 at a position of a first weld portion 42.
Figure 5:
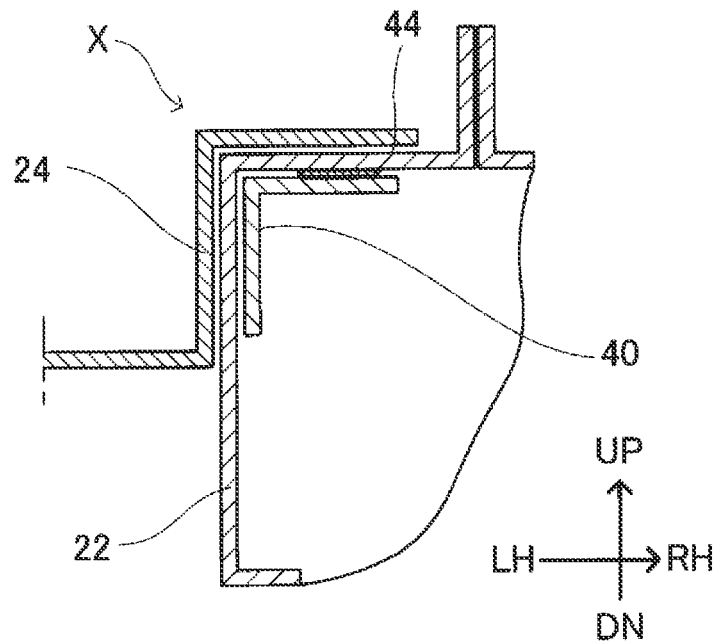
FIG. 5 illustrates a cross-sectional structure of a connected portion X of the dash cross member 24 and the right rocker 22 at a position of a second weld portion 44.

Next, a configuration relating to the reinforcements 40 will be described with reference to FIGS. 3 through 5. As described earlier, the reinforcement 40 is provided at each of the connected portion X of the dash cross member 24 and the right rocker 22 and the connected portion Y of the dash cross member 24 and the left rocker 23. These two connected portions X and Y are configured laterally symmetrically as to each other and have substantially the same structure. Accordingly, the connected portion X of the dash cross member 24 and the right rocker 22 will be primarily described below, and description of the connected portion Y of the dash cross member 24 and the left rocker 23 will be omitted.

The reinforcement 40 is a plate-like member having a letter-L shaped cross-section, and is provided along the connected portion X of the dash cross member 24 and the right rocker 22. The reinforcement 40 is located inside the right rocker 22, and extends in the front-rear direction along the inner face of the right rocker 22. Accordingly, at the connected portion X of the dash cross member 24 and the right rocker 22, the reinforcement 40 faces the dash cross member 24 across the right rocker 22, and the three members are disposed to be overlapped with each other. Note that the specific shape of the reinforcement 40 is not limited in particular.

Provided at the connected portion X of the dash cross member 24 and the right rocker 22 are a plurality of first weld portions 42 and a plurality of second weld portions 44. At each of the first weld portions 42, the dash cross member 24 and the right rocker 22 are welded to each other (see FIG. 4). At each of the second weld portions 44, the right rocker 22 and the reinforcement 40 are welded to each other (see FIG. 5). Accordingly, the three of the dash cross member 24, the right rocker 22, and the reinforcement 40, are integrally joined. Note that the first weld portions 42 and the second weld portions 44 are arrayed so as not to be overlapped with each other.

Thus, the reinforcement 40 is added to the connected portion X of the dash cross member 24 and the right rocker 22 in the vehicle 10 according to the present embodiment, and accordingly this connected portion X has a three-layered structure (i.e., the dash cross member 24, the right rocker 22, and the reinforcement 40). The three-layered structure is not welded all together, but rather is welded separately at two parts at a time. That is to say, the dash cross member 24 and the right rocker 22 are welded at the first weld portions 42. On the other hand, the right rocker 22 and the reinforcement 40 are welded at the second weld portions 44, of which the positions are different from the first weld portions 42. According to such a configuration, the three-layered structure in which the three members are disposed to be overlapped with each other can be integrated by welding with good quality, and the connected portion X of the dash cross member 24 and the right rocker 22 can be effectively reinforced by the reinforcement 40.

In the vehicle 10 according to the present embodiment, the reinforcement 40 is disposed inside the right rocker 22. Accordingly, the right rocker 22 is disposed between the dash cross member 24 and the reinforcement 40 at the connected portion X of the dash cross member 24 and the right rocker 22. Note however, that the reinforcement 40 may be disposed on the outer side of the right rocker 22 as another embodiment. That is to say, the reinforcement 40 may be added to the connected portion X of the dash cross member 24 and the right rocker 22 from the dash cross member 24 side.

Figure 6:
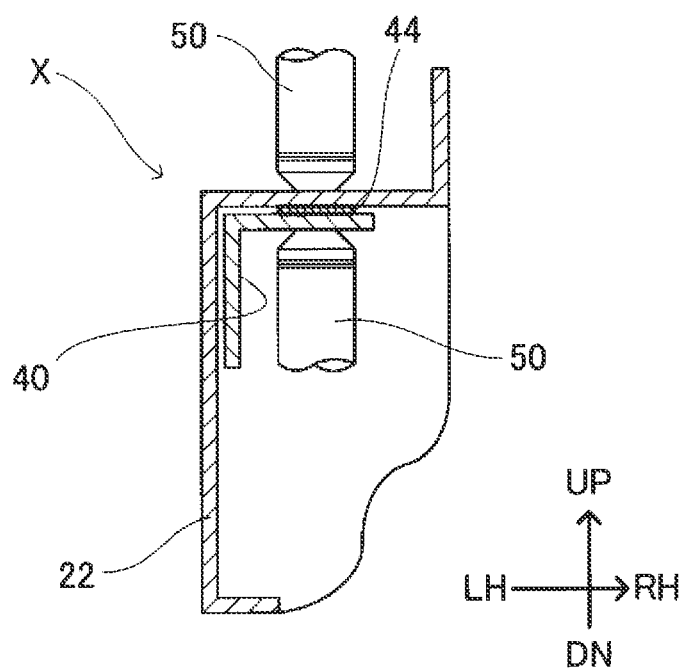
FIG. 6 schematically illustrates the way in which the right rocker 22 and a reinforcement 40 are welded to each other.

In the vehicle 10 according to the present embodiment, the reinforcement 40 has a plurality of notched portions 40a in accordance with the first weld portions 42. According to such a configuration, connecting the dash cross member 24 and the right rocker 22 (or the left rocker 23) can be performed by the following procedures. First, the right rocker 22 (or the left rocker 23) and the reinforcement 40 are combined, and these are welded to each other, as illustrated in FIG. 6. This welding can be performed by spot welding (resistance welding) using a pair of welding electrodes 50. The second weld portions 44 are formed by this process.

Next, the dash cross member 24 is further combined therewith, and the dash cross member 24 and the right rocker 22 (or the left rocker 23) are welded to each other at the positions of the notched portions 40a in the reinforcement 40, as illustrated in FIG. 7. This welding can also be performed by spot welding (resistance welding) using the welding electrodes 50. Accordingly, the two members of the dash cross member 24 and the right rocker 22 (or the left rocker 23) can be selectively welded to each other, even in a state in which the three members are disposed to be overlapped with each other. The first weld portions 42 are formed by this process.

In the vehicle 10 according to the present embodiment, the first weld portions 42 and the second weld portions 44 are at least partially arrayed alternately in the front-rear direction, at the connected portion X of the dash cross member 24 and the right rocker 22. According to such a configuration, the three members of the dash cross member 24, the right rocker 22, and the reinforcement 40 can be joined more strongly. The same configuration can be employed for the connected portion Y of the dash cross member 24 and the left rocker 23, although this is omitted from illustration.

In the vehicle 10 according to the present embodiment, the reinforcement 40 extends further rearward beyond a distal end 24t of the dash cross member 24, at the connected portion X of the dash cross member 24 and the right rocker 22 (see FIG. 3), although this is not limiting in particular. That is to say, the reinforcement 40 extends further rearward than a range over which the dash cross member 24 and the right rocker 22 face each other. According to such a configuration, the connected portion X of the dash cross member 24 and the right rocker 22 can be effectively reinforced by the reinforcement 40. The same configuration can be employed for the connected portion Y of the dash cross member 24 and the left rocker 23, although this is omitted from illustration.

Although embodiments have been described above in detail, these are only exemplifications, and do not limit the Claims. The technology set forth in the Claims includes various modifications and alterations of the specific example exemplified above. Technical elements described in the present specification or the drawings exhibit technical utility, either singularly or through various types of combinations, and do not limit combinations set forth in the Claims at the time of application. Also, the technology exemplified in the present specification or the drawings may achieve a plurality of objects simultaneously, and achieving one of these objects in itself has technical utility.

What is claimed is:

1. A vehicle configured with a battery pack disposed below a floor panel, the vehicle comprising:
    a dash cross member extending in a right-left direction along a front edge of the floor panel;
    a rocker that extends in a front-rear direction along a side edge of the floor panel and that is connected to an end portion of the dash cross member; and
    a reinforcement that reinforces a connected portion of the dash cross member and the rocker, wherein:
    at the connected portion of the dash cross member and the rocker, the dash cross member, the rocker, and the reinforcement are disposed to be overlapped with each other, and a plurality of first weld portions and a plurality of second weld portions are provided;
    the dash cross member and the rocker are welded to each other at each of the first weld portions;
    the rocker and the reinforcement are welded to each other at each of the second weld portions; and
    the first weld portions and the second weld portions are arrayed so as not to be overlapped with each other.

2. The vehicle according to claim 1, wherein the rocker is disposed between the dash cross member and the reinforcement at the connected portion of the dash cross member and the rocker.

3. The vehicle according to claim 2, wherein the reinforcement is located inside the rocker.

4. The vehicle according to claim 1, wherein the reinforcement has a plurality of notched portions in accordance with the first weld portions.

5. The vehicle according to claim 1, wherein the first weld portions and the second weld portions are, at least partially, arrayed alternately in the front-rear direction.

6. The vehicle according to claim 1, wherein the reinforcement extends rearward beyond a distal end of the dash cross member, at the connected portion of the dash cross member and the rocker.

* * * * *